United States Patent [19]

Hotchkin

[11] Patent Number: 5,611,056
[45] Date of Patent: Mar. 11, 1997

[54] METHOD FOR CONTROLLING THE EXPANSION OF CONNECTIONS TO A SCSI BUS

[75] Inventor: Glenn T. Hotchkin, Mission Viejo, Calif.

[73] Assignee: Unisys Corporation, Blue Bell, Pa.

[21] Appl. No.: 566,479

[22] Filed: Dec. 4, 1995

Related U.S. Application Data

[63] Continuation of Ser. No. 299,707, Aug. 31, 1994.

[51] Int. Cl.$^6$ .............................. G06F 13/00; G06F 13/28
[52] U.S. Cl. .......................... 395/281; 395/285; 395/308; 395/296; 364/DIG. 1; 364/DIG. 2
[58] Field of Search ..................... 395/281, 285, 395/293, 296, 308; 364/DIG. 1, DIG. 2

[56] References Cited

U.S. PATENT DOCUMENTS

| | | | |
|---|---|---|---|
| 4,851,998 | 7/1989 | Hospodor | 364/580 |
| 5,233,692 | 8/1993 | Gajjar et al. | 395/309 |
| 5,247,622 | 9/1993 | Choi | 395/294 |
| 5,274,783 | 12/1993 | House et al. | 395/281 |
| 5,283,872 | 2/1994 | Ohnishi | 395/309 |
| 5,333,277 | 7/1994 | Searls | 395/325 |
| 5,367,647 | 11/1994 | Coulson et al. | 395/325 |
| 5,379,405 | 1/1995 | Ostrowski | 395/500 |
| 5,410,674 | 4/1995 | Lawler | 395/500 |
| 5,457,785 | 10/1995 | Kikinis et al. | 395/308 |

*Primary Examiner*—Tod R. Swann
*Assistant Examiner*—Tuan V. Thai
*Attorney, Agent, or Firm*—J. Ronald Richebourg; Mark T. Starr; Steven R. Petersen

[57] ABSTRACT

The present invention is useful in a data processing system having a data processor coupled to a SCSI channel disposed for transmitting and receiving data between the data processor and a peripheral storage subsystem. The present invention is a method for controlling a bridge controller that permits expanding the maximum allowable number of disk drives connectable to the SCSI channel. In particular the method comprises the steps of receiving a command from the SCSI channel; initializing queue pointers from a memory in response to the command; determining the command type and setting flags and pointers in response thereto; when the command is a write operation, transferring data from the SCSI channel and storing the data in the memory; selecting a disk drive to receive the data by sending message and command bytes to the disk drive; and, transferring the data from the memory to the selected disk drive. The method of the present invention also includes the steps of transferring data from the disk drive and storing the data in the memory when the command is a read command, selecting a SCSI channel to receive data by sending message bytes to the SCSI channel, and transferring the data from the memory to the selected SCSI channel.

3 Claims, 16 Drawing Sheets

METHOD FOR CONTROLLING THE EXPANSION OF CONNECTIONS TO A SCSI BUS

This is a continuation of copending application Ser. No. 08,299,707, filed on Aug. 31, 1994.

FIELD OF THE INVENTION:

The disclosed invention relates to the field of peripheral devices and more particularly to a method for controlling a circuit adapted for expanding the number of peripheral devices connectable to a SCSI (Small Computer Systems Interface) bus using protocol standards.

BACKGROUND OF THE INVENTION:

The widespread and growing acceptance of SCSI is largely a function of the combination of simplicity and the functionality it offers. SCSI is a bus architecture, and as such dictates a set of standard signal protocols. A bus can support up to eight separate addresses. The architecture allows for multiple host connections and peripheral devices to coexist on the same bus. With one host connected to the bus, the remaining seven addresses can be used to attach up to seven peripheral devices.

Most peripheral interfaces support a master/slave relationship, with the host as the master and the peripheral as the slave. This arrangement is satisfactory in the high end of the market where the complex disk subsystems include multiple controllers, multiple ports and multiple paths. However, these sophisticated devices are cost-prohibitive in the entry/medium computer system marketplace. SCSI can provide substantial functionality in this area because of its peer-to-peer design. One of the problems with the conventional prior art arrangement is that the SCSI channel is limited to only seven devices. In many applications it would be helpful to couple many more drives to the same channel.

BRIEF SUMMARY OF THE INVENTION:

It is an object of the present invention to provide a method to control connectivity circuitry that is an improvement over and above the standard SCSI connectivity.

It is another object of this invention to provide program control of circuitry that allows an increase in the number of Storage Data Modules for each host adapter from one to seven for an 8-bit host adapter, or to 15 for 16-bit host adapters.

It is yet another object of this invention is to provide a method that will allow four host adapters to address dual ported drives in a single Storage Data Module.

A still further object of this invention is to provide a method that allows a single host adapter to address up to forty-nine 8-bit devices or one hundred and five 16-bit devices.

The present invention is useful in a data processing system having a data processor coupled to a SCSI channel disposed for transmitting and receiving data between the data processor and a peripheral storage subsystem. The present invention is a method for controlling a bridge controller that permits expanding the maximum allowable number of disk drives connectable to the SCSI channel. The method comprises the steps of receiving a command from the SCSI channel; initializing queue pointers from a memory in response to the command; determining the command type and setting flags and pointers in response thereto; when the command is a write operation, transferring data from the SCSI channel and storing the data in the memory; selecting a disk drive to receive the data by sending message and command bytes to the disk drive; and, transferring the data from the memory to the selected disk drive.

These and other objects, advantages, aspects and features of the present invention will be more fully understood and appreciated upon consideration of the following detailed description of one embodiment, presented in conjunction with the accompanying drawings.

Figure 1:
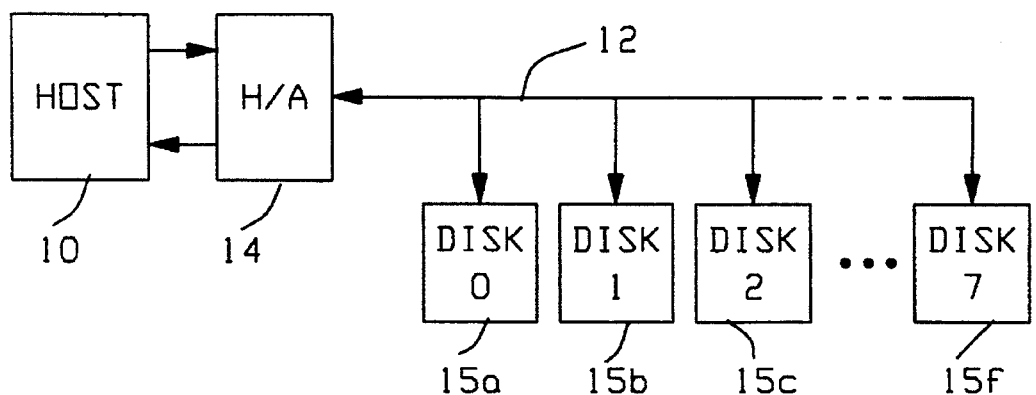
FIG. 1 is a block diagram of a conventional prior art system arrangement of SCSI bus connections for disk drives.

DETAILED DESCRIPTION:

Referring now to the drawings and FIG. 1 in particular, a host computer 10 is coupled to a SCSI bus 12 in a conventional manner by means of a host adapter 14. A plurality of peripheral devices, such as disk drives 15a–15f, are coupled to the same SCSI bus 12. This is the prior art arrangement of coupling disk drives to a host computer using a SCSI channel.

For background purposes, the signals transmitted on the SCSI bus 12 are as follows:

ACK(ACKNOWLEDGE): Driven by the Initiator to acknowledge an Information transfer.

ATN(ATTENTION): Driven by the Initiator when connected to get the Target's attention for sending a MESSAGE OUT.

BSY(BUS BUSY): Indicates that the SCSI Bus is in use. Also, used to gain control of the Bus.

C/D(COMMAND OR DATA): Driven by the Target to indicate the Bus Phase. In general, it indicates whether data or "other information" is being transferred.

DB(7-0) (DATA BUS): Driven by either device, as determined by the state of the I/O signal. Contains the data that is sent from one device to the other during an Information Transfer.

DB(P) (DATA BUS PARITY): Driven by either device. Contains the parity bit for the data that is sent on DB(0-7) from one device to the other during Information Transfer.

I/O (INPUT OR OUTPUT): Driven by the Target to indicate the Bus Phase. In general, I/O indicates the bus information transfer direction. I/O also determines the SELECTION and RESELECTION phases. "True/Asserted" indicates the direction from the Target to the Initiator.

MSG (MESSAGE PHASE): Driven by the Target to indicate the Bus Phase. In general, indicates whether the "other" information alluded to under C/D is a MESSAGE IN, MESSAGE OUT, COMMAND, or STATUS information.

REQ (REQUEST): Driven by the Target to request an Information Transfer.

RST (BUS RESET): Driven by any device to clear all devices from the bus. May cause "power on reset" type condition on many devices.

SEL (SELECT DEVICE): Driven by: (1) an Initiator to select a Target; or, (2) a Target to reselect an Initiator.

Figure 2:
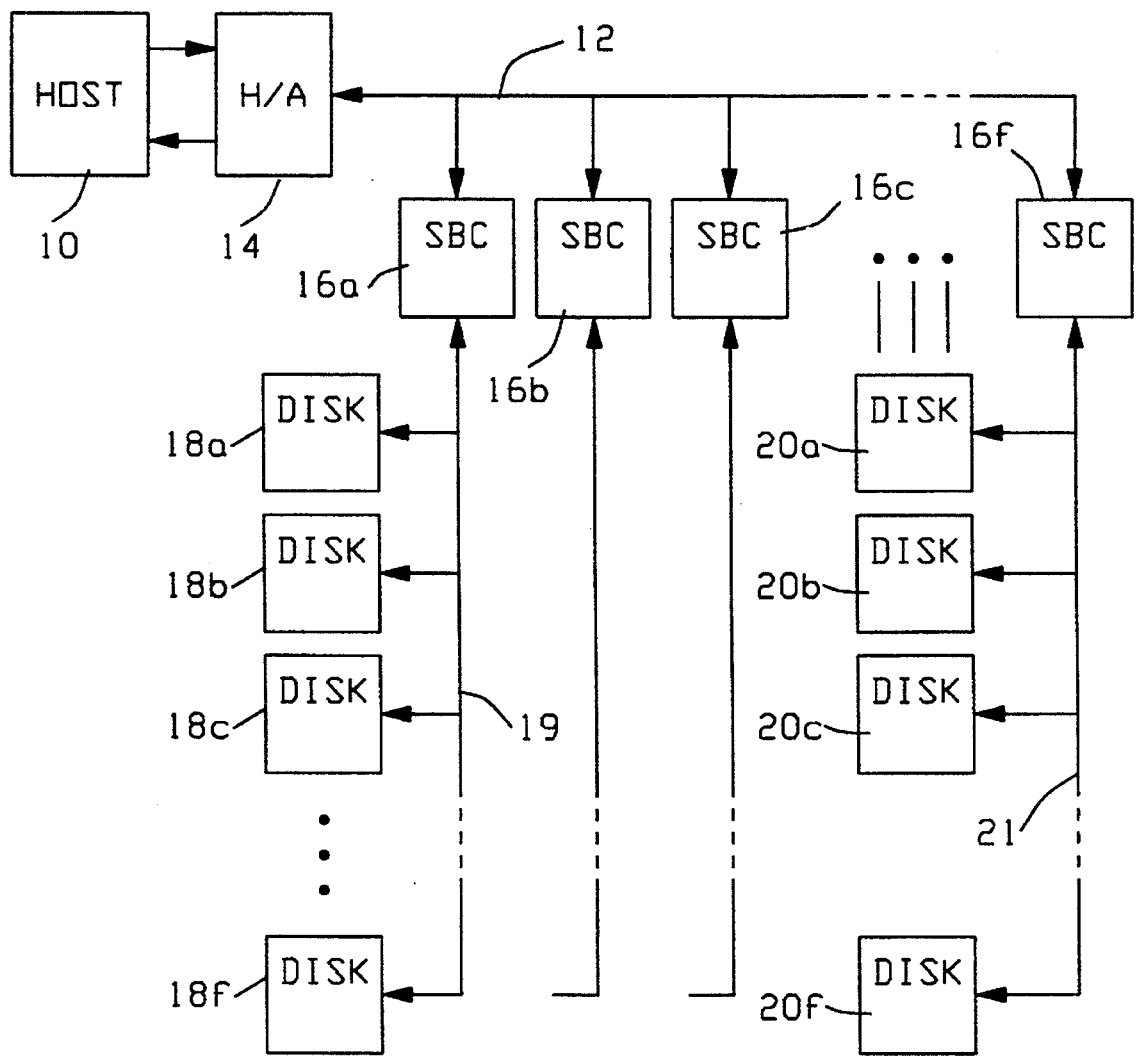
FIG. 2 is a block diagram of an expanded array of disk drives employing the circuit control method of the present invention.

Referring now to FIG. 2, a system is shown which has been expanded by use of the SCSI Bridge Controller ("SBC") employing the method of the present invention. In particular, one or more circuits 16a–16f are connected to the individual peripheral device slots; and, each of these circuits has the capability of coupling up to seven individual disk drives by using the SBC. Thus, it is possible to increase the number of disk drives connected to a single SCSI channel by seven. That is, disk drives 18a–18f are coupled to circuit 16a by means of channel 19, and disk drives 20a–20f are coupled to circuit 16f by means of channel 21 with similar connections of disk drives to circuits 16b–16e.

Figure 3:
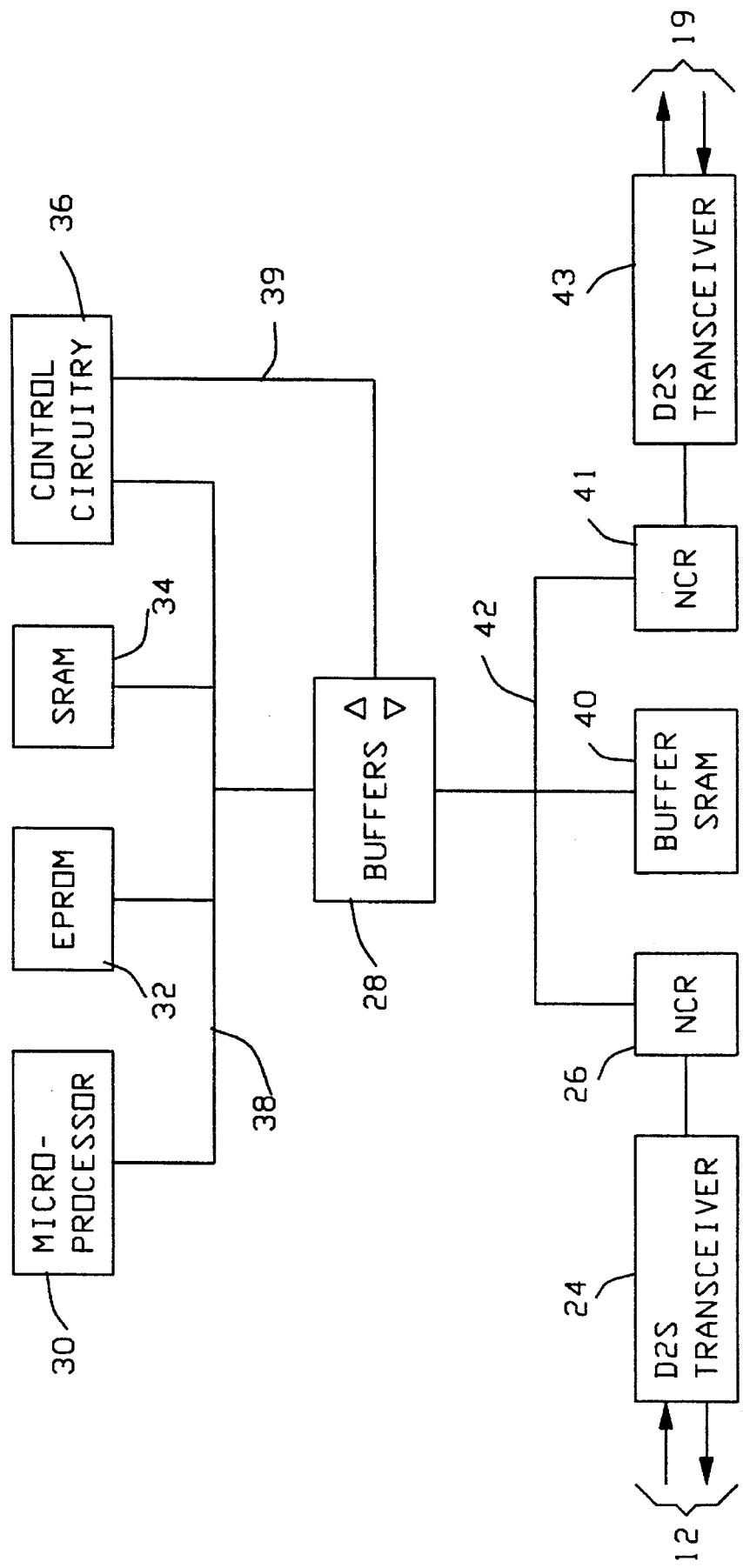
FIG. 3 is a block diagram of the SCSI Bridge Controller.

Referring now to FIG. 3, a block diagram of the circuit 16a is shown. Lines 12 from the host adapter 14 are coupled to input terminals of a transceiver 24, which converts the differential signal on the SCSI channel to a single-ended format. Details of such a transceiver are disclosed in U.S. Pat. No. 5,379,405 entitled A SCSI CONVERTER WITH SIMPLE LOGIC CIRCUIT ARBITRATION FOR PROVIDING BILATERAL CONVERSION BETWEEN SINGLE ENDED SIGNALS AND DIFFERENTIAL SIGNALS, by Carl Ostrowski and assigned to the same assignee as this application. The single-ended output of the transceiver 24 is coupled to an input of a 53C720 SCSI Controller Chip 26, available from NCR Corporation, Dayton, Ohio and the output thereof is coupled to a bilateral buffer 28. The other side of the buffer is coupled to a microprocessor 30, which could be any commercially available microprocessor, however in the disclosed embodiment a 386sx-20 Microprocessor is used. This microprocessor is available from a number of suppliers including Intel Corporation of Santa Clara, Calif. Moreover, the structure and operation of microcontrollers, similar to their use herein, is explained in greater detail in a book entitled "Microcontrollers: Architecture, Implementation, and Programming" by Kenneth Hintz and Daniel Tabak and published by McGraw-Hill, Inc. of New York, N.Y.

The outputs of the buffers 28 are also coupled to data/address lines of an Electrically Erasable PROM 32, a static SRAM 34 and a control circuit 36 by means of a CPU bus 38, which in one embodiment is 16 data bits wide. The control circuit is also coupled to a directional control input of the buffers 28 by means of a line 39. The other side of the buffers 28 is coupled to data/address lines of a buffer SRAM 40 and the SCSI Controller chip 26 as well as another SCSI Controller Chip 41 by means of a DMA data bus 42. The SCSI Controller Chip 41 is coupled to another transceiver 43, which is coupled to the channel 19.

In one embodiment, the EEPROM 32 has a capacity of kilobytes; the SRAM 34 has a capacity of kilobytes; and, the control circuit 36 is shown in greater detail in FIG. 4 and described in greater detail hereinafter. The SRAM 40 has a capacity of kilobytes. The bus 38 is independent of the bus 42 and the CPU can access the bus 42 by control signals from the control circuit 36 via the line 39, which change the direction of data flow through the buffers 28. The NCR chips 26 and 41 have their own processors with separate 32-bit wide DMA channels and compete with the microprocessor (sometimes referred to herein as the "CPU") 30 for access to the bus 42. The CPU 30 can operate independently of data flowing into or out of the SRAM 40 via the NCR chips 26 or 41.

In a typical operation, assume that the transceiver 24 is connected to the host via the lines 12, and the transceiver 43 is connected to the drive via the lines 19. Assume further that data is to be transferred from the host to the drive for storage therein. The NCR chip 26 generates a signal to notify the CPU that data is arriving for storage in the SRAM 40. The CPU instructs the NCR chip 26 to receive the data and transfer into the SRAM 40 via its 32-bit wide DMA channel (in a manner similar to a disk writing onto media). Data is transferred in bursts of eight double words at a time. The CPU may access the bus 42 between any of the bursts of data. Next, the CPU instructs the NCR chip 41 to remove the data from the SRAM 40 and transmit it through the transceiver 43 onto the lines 19. The NCR chips 26 and 41 time multiplex access to the DMA bus 42. Also, the CPU 30 can be time multiplexed into the bus 42 to examine the chips 26 or 41 of the SRAM 40 for status information, etc.

Figure 4:
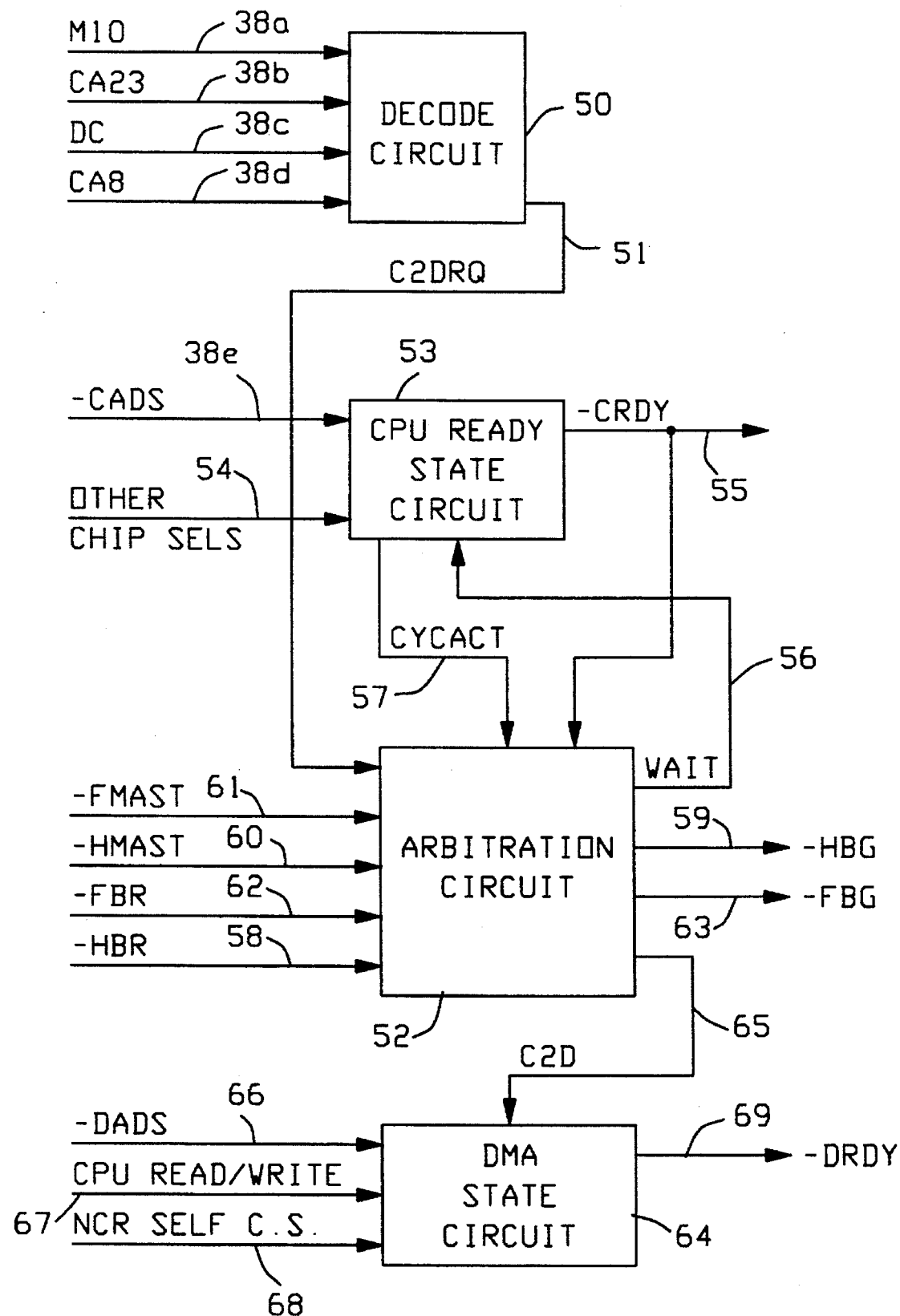
FIG. 4 is a block diagram of the control circuit of the diagram shown in FIG. 3.

Referring now to FIG. 4, a block diagram of the control circuitry 36 is shown. Control signals from the microprocessor 30 are supplied on lines 38a, 38b, 38c and 38d to a decode circuit 50. As will be amplified hereinafter, the circuit 50 generates a signal requesting that the CPU be given access to the DMA bus 42, which signal is referred to herein as "C2DRQ" and is supplied on a line 51 to an arbitration circuit 52. The circuit 50 decodes various signals so as to generate the C2DRQ signal. For example, if an I/O address operation requires access to either of the NCR chips 26 or 41, the circuit 50 decodes the appropriate signals and generates the C2DRQ signal. Moreover, if access is required to the SRAM 40 the circuit 50 decodes the signals and again generates the C2DRQ signal.

The CPU 30 generates an address/data signal, referred to herein as "CADS" each time it wishes to perform an operation and this signal is supplied on a line 38e to a CPU Ready State Circuit 53. Other signals entitled Other Chip Selects, which is indicative of whether any other chip on the CPU bus 38 is selected, is supplied on a line 54 to the Circuit 53. A signal (entitled "CRDY") indicative of the CPU completing its bus cycle is provided at an output of the Circuit 53 on a line 55. The Arbitration Circuit acts as a "traffic cop" among the various circuits of this apparatus, and generates a "WAIT" signal when a request cannot be serviced. The WAIT signal is supplied on a line 56 from the Circuit 52, and is applied to an input terminal of the Circuit 53. A signal indicating that the CPU is active is supplied on a line 57 from the Circuit 53 to the Circuit 52, which signal is denoted herein as "CYCACT".

At this juncture of the description it should be pointed out that a convention will be employed denoting the host side of the apparatus by the letter "H" and the drive side by the letter "F". Assume that data is being transmitted from the host to the drive. Then, data would appear at the transceiver 24 on the bus 12 and a bus request signal -HBR would be applied to the Circuit 52 on a line 58. If conditions are met, i.e. the bus is not busy with another service, then the bus request will be granted to the host. This grant signal is referred to herein as HBG, and is supplied on a line 59 from the Circuit 52. Once the bus is granted to the host, the host NCR (e.g. 26) will respond with a signal referred to herein as host master or HMAST on a line 60. Likewise, if the grant is to the drive NCR then it will respond with an FMAST signal on a line 61.

A drive side request for the bus is denoted by signal FBR, which is supplied on a line 62 to the Circuit 52. The grant to the drive side request is denoted FBG and is supplied on a line 63 from the Circuit 52.

When a transfer of data is to take place from the CPU bus 38 to the DMA bus 42, a request signal (denoted "C2DRQ") is supplied from the Circuit 51 to the Arbitration Circuit on a line 51. The Arbitration Circuit determines if and when the bus 42 can be granted to the CPU and sends a grant signal (denoted "C2D") to a DMA State Circuit 64 on a line 65.

The NCR chips 26 and 41 generate an address/data signal valid, referred to herein as "DADS", each time they wish to perform an operation, and this signal is supplied to the Circuit 64 on a line 66. Additional signals "CPU READ/WRITE" and "NCR SELF C.S." (i.e., Chip Select) are supplied on lines 67 and 68 to the Circuit 64, which signals will be amplified hereinafter. The Circuit 64 provides a signal on a line 69 indicating that the DMA bus 42 is ready for the next cycle, which signal is denoted herein as DRDY.

Generally, the control circuitry 36 functions to control the transfer of data to and from the microprocessor 30 (i.e. CPU) as well to and from the Buffer SRAM 40. This function also controls the transfer of data to or from either of the buses 12 or 19. For example, in one embodiment the control circuitry 36 allows a burst of eight two-word bytes of data from the bus 12 to the SRAM 40 or from the bus 19 to the SRAM 40. If a bus request (C2DRQ signal) occurs during such transfers of data, the WAIT signal postpones such request until the end of the eight-byte burst of data. These control functions will become clearer following a description of the details of the Circuits 50, 52, 53 and 62 taken in conjunction with FIGS. 5–8.

Figure 5:
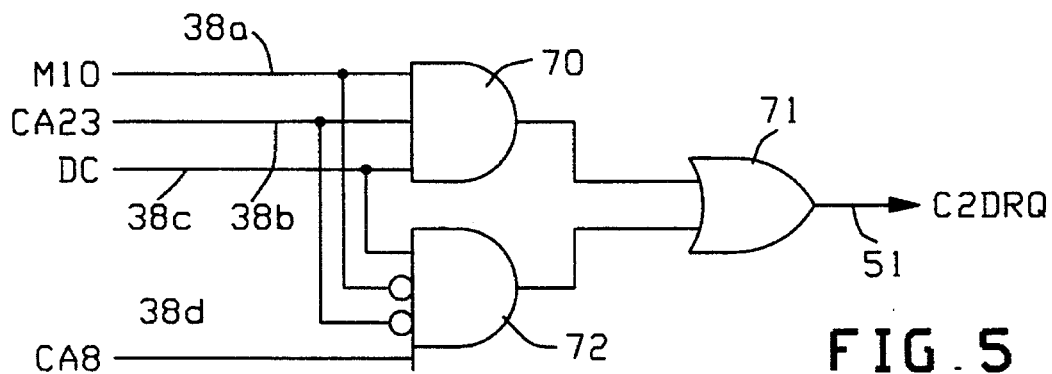
FIG. 5 is a schematic diagram of the Decode Circuit.

The details of the Decode Circuit 50 are shown in the schematic diagram of FIG. 5. The I/O operation signals supplied on the lines 38a, 38b and 38c are applied to the three inputs of an AND gate 70 and the output thereof is supplied to one of two inputs of an OR gate 71. The signals supplied on lines 38a and 38b are coupled to two inverting input terminals of an AND gate 72, respectively. The signal supplied on line 38c is supplied to a third input of the AND gate 72 and the signal supplied on the line 38d is supplied to a fourth input of the AND gate 72. The output of the AND gate 72 is coupled to a second input of the OR gate 71, and the output of the OR gate 71 provides the C2DRQ signal on the line 51.

Figure 6:
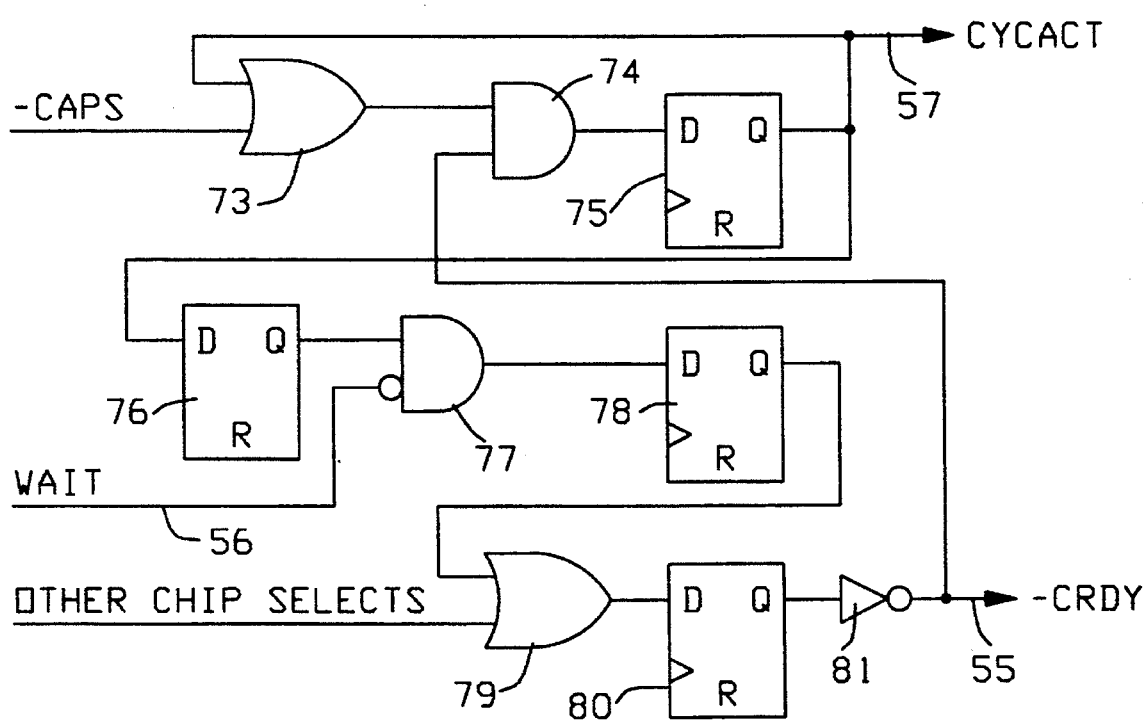
FIG. 6 is a schematic diagram of the CPU Ready State Circuit.

Referring now to FIG. 6, details of the CPU Ready State Circuit 53 are shown. The CADS signal line 52 is coupled to an inverting input terminal of an OR gate 73, and the output thereof is coupled to one of two input terminals of an AND gate 74. The CADS signal, which in this embodiment is pulsed active low, represents that the CPU wants to do something. Once the CPU receives the CRDY signal the requested operation has been completed.

The output of the AND gate 74 is coupled to the D data input terminal of a flip-flop 75 and the Q true output thereof is coupled to the second input of the OR gate 73, to the line 57 which conveys the CPU active (CYCACT) signal, and to the D data input terminal of another flip-flop 76.

The Q true output of the flip-flop 76 is coupled to one of two inputs of an AND gate 77 and the output thereof is coupled to the D data input of yet another flip-flop 78. The WAIT signal line 56 is coupled to an inverting input terminal of the AND gate 77. The Q true output of the flip-flop 78 is coupled to one of two inputs of an OR gate 79 and the output thereof is coupled to the D data input of a flip-flop 80. The chip select signal supplied on the line 54 is coupled to the second input of the OR gate 79. The Q true output of the flip-flop 80 is coupled through an inverter 81 to the line 55 transmitting the CRDY signal. Also, the line 55 is coupled back to the second input of the AND gate 74.

For example, if the CPU desires access to the SRAM 40 the first thing that occurs is the CADS signal is pulsed active low. This sets a latch formed by the gates 73 and 74 and the flip-flop 75. The CPU active signal CYCACT goes high and stays high until this latch is reset. When the CRDY signal goes low the latch is reset. The CYCACT signal is passed through the flip-flops 76, 78 and 80 and through the inverter 81 to produce the CRDY signal if the WAIT signal is low. Also, if other chips of the controller have been selected, and the line 54 is high then the flip-flop 80 will be set and CRDY is pulsed low on the line 55. The CRDY signal being pulsed low informs the CPU that it can perform other operations at this time.

Figure 7:
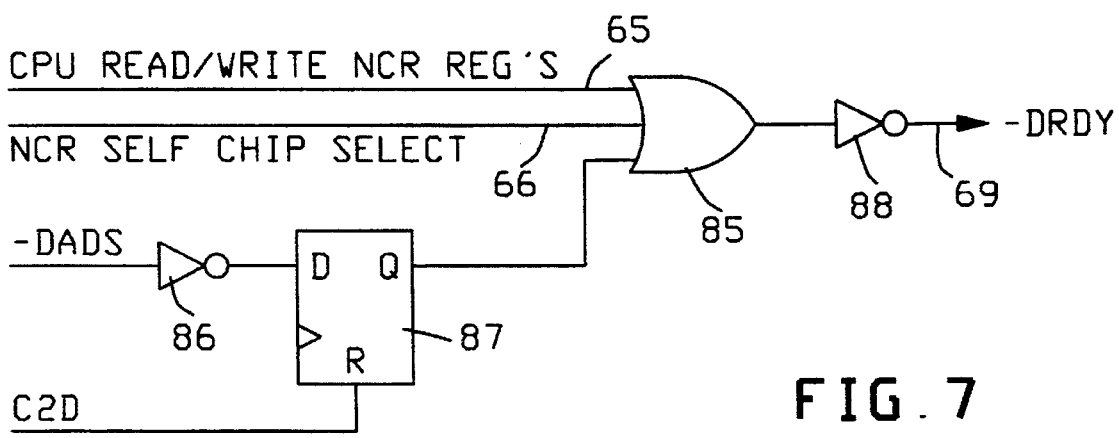
FIG. 7 is a schematic diagram of the DMA State Circuit.

Details of the DMA State Circuit 62 are shown in FIG. 7, wherein the lines 67 and 68 are coupled to two of three inputs of an OR gate 85. The signals supplied on lines 67 and 68 are for special cases which will supply differently timed ready signal to the NCR chips of the DMA bus 42. The DMA bus address signal, DADS, supplied on the line 64 is coupled through an inverter 86 to the D data input terminal of a flip-flop 87. The line 65, which conveys the C2D signal, is coupled to the Reset terminal of the flip-flop 87. The Q true output of the flip-flop 87 is coupled to the third input of the OR gate 85 and the output of this OR gate is coupled through an inverter 88 to the line 69 transmitting the DMA bus ready DRDY, signal.

In operation, when the DADS signal is pulsed active low which means the beginning of a DMA operation, the DRDY signal is pulsed active low on the line 69. When this occurs the NCR chip is freed up to perform any other operation. This sequence of operations continues until the NCR chip is out of data to be transferred.

Figure 8:
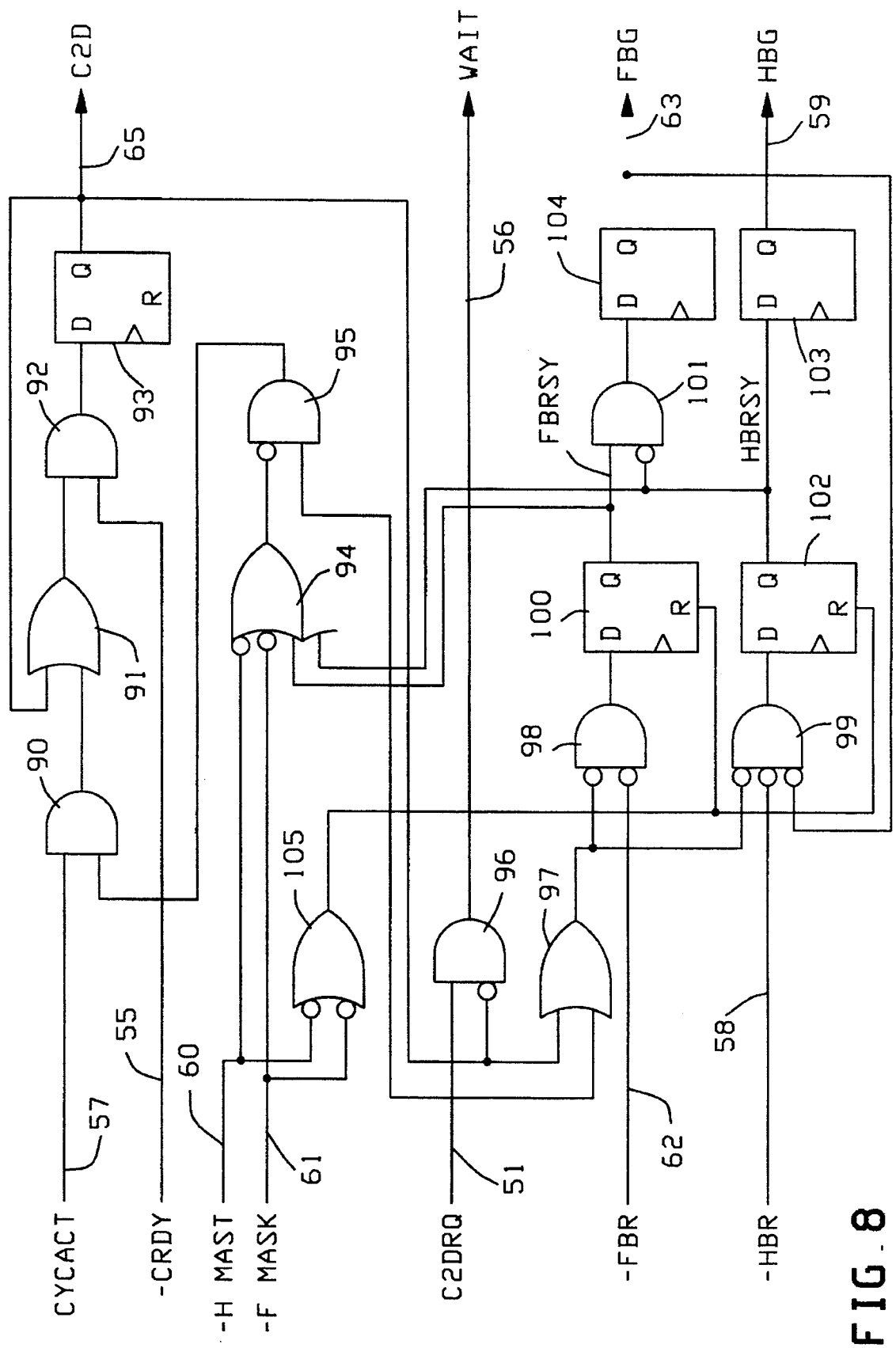
FIG. 8 is a schematic diagram of the Arbitration Circuit.

Referring now to FIG. 8, details of the Arbitration Circuit 52 are shown. The CPU active, "CYCACT", signal on line 57 is supplied to one of two inputs of an AND gate 90, and the output thereof is coupled to one of two inputs of an OR gate 91. The output of the OR gate 91 is coupled to one of two inputs of an AND gate 92, and the output thereof is coupled to the D data input of a flip-flop 93. The Q true output of the flip-flop 93 is coupled to the line 63, which transmits the CPU to DMA signal "C2D". The line 63 is coupled back to the second input of the OR gate 91 thereby forming a latch circuit.

The host and drive master signals, HMAST and FMAST respectively, are supplied on the lines 60 and 61 to two inverting inputs of an OR gate 94 and the output thereof is coupled to an inverting input of an AND gate 95. The output of the AND gate 95 is coupled back to the second input of the AND gate 90.

The line 51 transmitting the CPU to DMA bus request signal, "C2DRQ", is coupled to one of two inputs of an AND gate 96 and the output thereof is coupled to the line 56 transmitting the WAIT signal. The line 51 is also coupled to the second input of the AND gate 95, and to one of two inputs of an OR gate 97. The output of the OR gate 97 is coupled to inverting input terminals of AND gates 98 and 99. The line 60 transmitting the drive bus request signal, FBR, is coupled to a second inverting input of the AND gate 98. The output of the AND gate 98 is coupled to the D data input of a flip-flop 100. The Q true output of the flip-flop 100 is coupled to one of two inputs of an AND gate 101 and to a third input of the OR gate 94.

The line 58 transmitting the host bus request signal, HBR, is coupled to an inverting input of the AND gate 99, and the output thereof is coupled to the D data input of a flip-flop 102. The Q true output of the flip-flop 102 is coupled to the D data input of another flip-flop 103, and to the fourth input of the OR gate 94. The output of the flip-flop 100 is referred to herein as the drive bus request sync signal, FBRSY; and, the output of the flip-flop 102 is referred to herein as the host bus request sync signal, HBRSY. The output of the AND gate 101 is coupled to the D data input of yet another flip-flop 104, and the Q true output thereof is coupled to the line 61 transmitting the drive bus grant signal, FBG. Also, the line 61 is coupled back to a third inverting input of the AND gate 99 to inhibit a host bus grant while the drive has been granted the bus. The Q true output of the flip-flop 103 is coupled to the line 59 transmitting the host bus grant, HBG.

The host and drive master signals, HMAST and FMAST supplied on the lines 60 and 61 are also coupled to two inverting inputs of an OR gate 105 and the output thereof is coupled to the RESET input terminals of the flip-flops 100 and 102.

The C2D signal when high indicates that the CPU 30 has been granted the bus 42. Thus, via the OR gate 97 the AND gates 98 and 99 are disabled. This means that the flip-flops 100 and 101 cannot be set, which means that neither the host nor the drive can be granted the bus, i.e., neither FBG or HBG can go high. If C2D is low, i.e., the CPU does not have the bus, and the bus request signal C2DRQ goes high, the AND gate 96 is enabled, which means that the WAIT signal goes high if the CPU 30 is requesting the DMA bus 42, thereby making the CPU 30 wait. The CPU 30 will wait until the bus is available. The FMAST and the HMAST signals determine when the bus is available.

If either FMAST or HMAST is active low, the output of the OR gate 94 goes high and the AND gate 95 is disabled. This means that the AND gate 90 is disabled and the flip-flop will not go high. If either of the signals at the output of the flip-flops 100 and 102, FBRSY of HBRSY respectively, the same result will be reached through the OR gate 94. These signals are sync signals and hold a grant to the CPU 30 while FBG or HBG is going high (i.e. granting the bus to the host or the drive). The reason for this is that in the process of granting the bus to the host or to a drive it is undesirable to let the CPU 30 jump in and grab the bus away from them.

When arbitrating between two NCR chips, the worse case occurs when both request happens at the same time. I.e., both flip-flops 100 and 102 are set at the same time. The sync signals FBRSY and HBRSY are both high and C2D is inhibited by gates 94 and 95. However, the output of the flip-flop 102 is coupled to an inverting input of the AND gate 101, which inhibits setting the flip-flop 104. Hence, in this case HBG goes high and FBG stays low. The master signal HMAST goes low because the host NCR chip 26 claims the bus grant. As a result, the output of the OR gate 105 goes high, which resets the flip-flops 100 and 102. When the host NCR chip has finished the task for which the bus was granted, the HMAST signal goes high again.

If the FBR signal beats the HBR signal, the FBG will go high, and because of the loop back to the AND gate 99 any subsequent HBR signals will be inhibited from interfering from the grant to the drive side.

Figure 9:
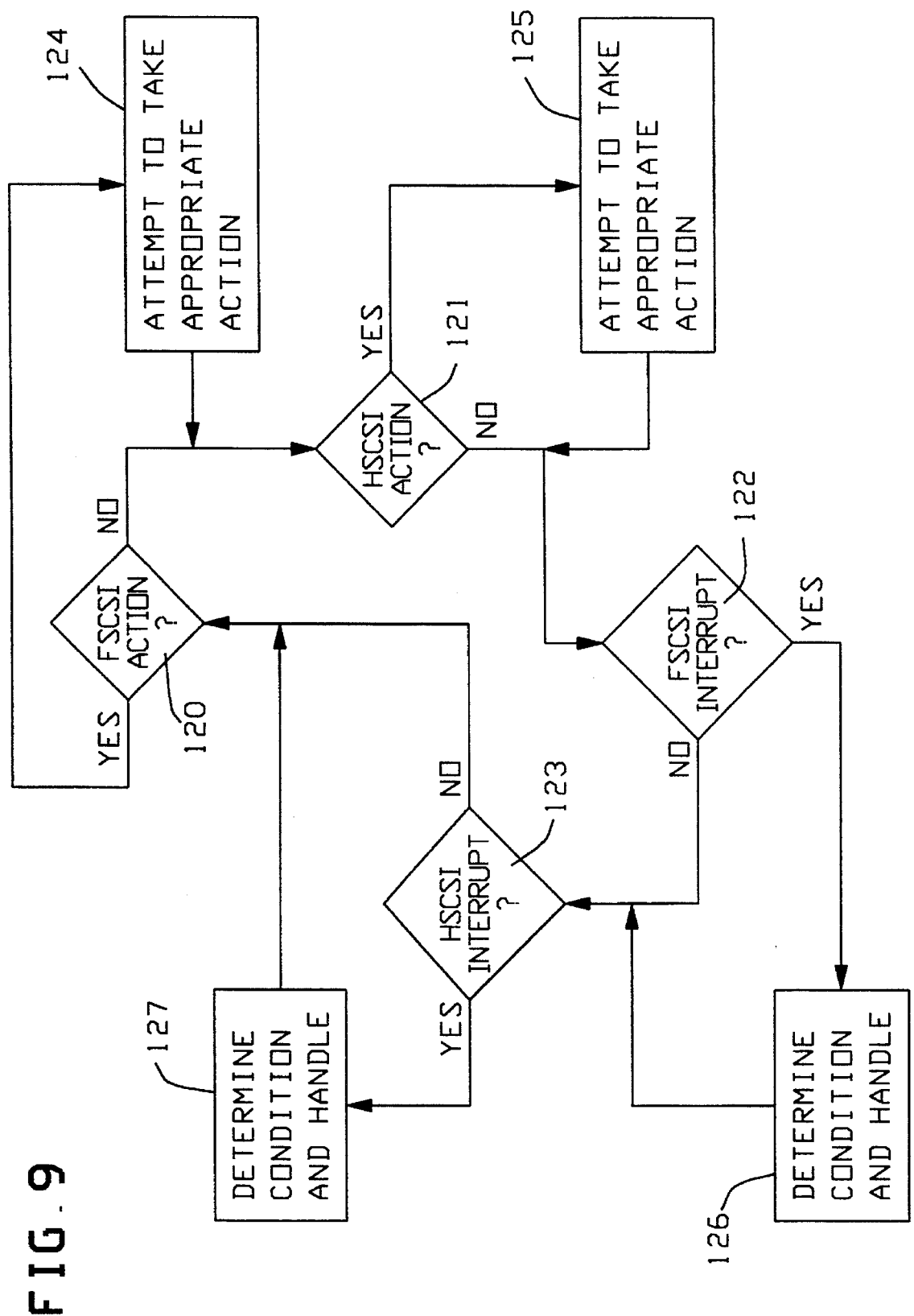
FIG. 9 is a flow chart of the CPU idle routine.

Referring now to FIG. 9, a flow chart illustrates an idle routine, which is part of the C code or program running in the microprocessor 30. In general, this loop is a representation of the CPU looking for something to do. When an interrupt occurs, an action is taken. Beginning with decision diamond 120, an inquiry is made as to whether or not this is an FSCSI action, i.e. disk action. If not, a branch is taken to another decision diamond 121 where an inquiry is made as to whether or not this is an HSCSI action, i.e. host action. If not, then a branch is taken to another decision diamond 122 where an inquiry is made as to whether or not this is an FSCSI interrupt, i.e. an interrupt from the disk side SCRIPTS code. If not then a branch is made to yet another decision diamond 123 where an inquiry is made as to whether or not this is an HSCSI interrupt, i.e. an interrupt from the host side SCRIPTS code.

If the action is either an FSCSI or an HSCSI then an attempt is made to take the appropriate action as depicted by blocks 124 and 125, respectively. Likewise, if the interrupt is by either the FSCSI or the HSCSI then the condition must be determined and handled as depicted by blocks 126 and 127, respectively. Details of these functions will be explained in greater detail in conjunction with a description of FIGS. 10 through 12.

By way of background, the code running in the NCR chips 26 and 41 is referred to herein as SCRIPTS, which will interrupt the main C program to determine which interrupt has occurred via a register value being set by the interrupt. SCRIPTS is a program assembly language designed for the NCR chips.

For example, if a command is applied on the bus 12, which is supplied to the NCR chip 26, the SCRIPTS code signifies to the microprocessor that a command has been received. The SCRIPTS code determines who sent it. Operation of the SCRIPTS code is stopped at this point. The microprocessor 30 then determines the interrupt, initializes the pointers and determines the type of operation that is to be performed; that is it a READ or a WRITE data operation?

Assume further that it is a write data operation. The Buffer SRAM 40 will store data until a predetermined buffer empty/full ratio threshold is reached. A flag is set in the memory 40 by the microprocessor 30. Next, the backend or the disk side is set up. A command is then sent to the drive. The target drive is known and the command is loaded. The back end NCR is selected to perform a selection phase of the target drive. This is the FSCSI Action, as depicted by diamond 120 in FIG. 9 for example.

An HSCSI Action, as depicted by the diamond 121 is the exact opposite. E.g., on a READ operation the SCRIPTS code determines when to go to the host. Connection is not maintained throughout the operation in order to more efficiently use the bus.

For an HSCSI ACTION, a re-connection is made to the host. Interrupts are for the NCR chips to determine what to do next because the operations are segmented into modules as to what needs to be done.

The SCRIPTS code is not handling all of the SCSI interrupts. It is the C code that is telling the SCRIPTS code what portion of SCSI to perform. Hence, the C code is the primary code with the NCR chips handling the SCSI interrupts.

In the action flags, there is a data bit corresponding to each LUN (Logical Unit Number). If multiple commands are to be executed, there is a priority of servicing interrupts so only one will be handled at a time. Thus, a command cannot be issued while another operation is being performed on a drive. When the bus is free, the next command will be executed.

Figure 10A:
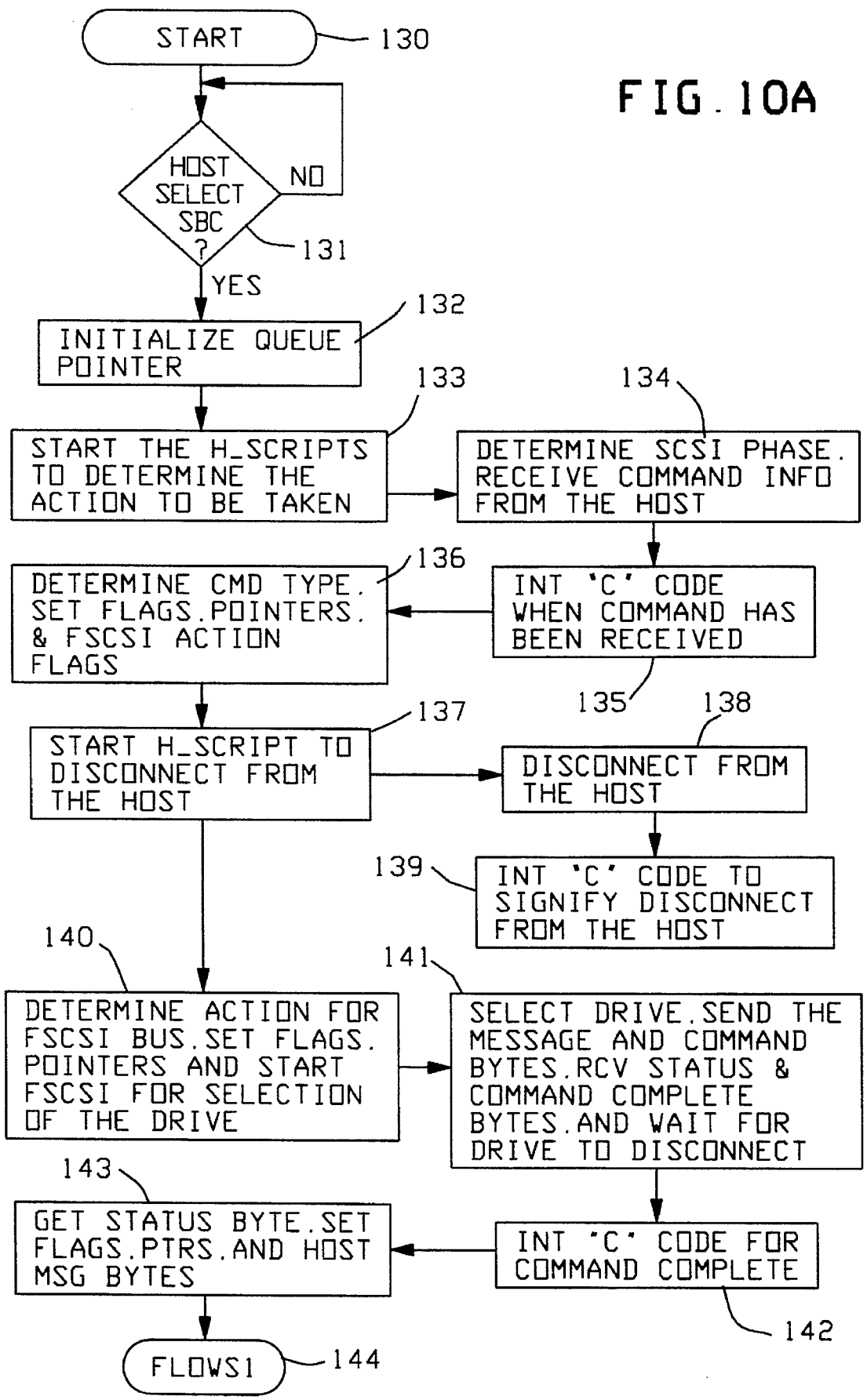
FIGS. 10A and 10B together are a flow chart of a test operation.
Figure 10B:
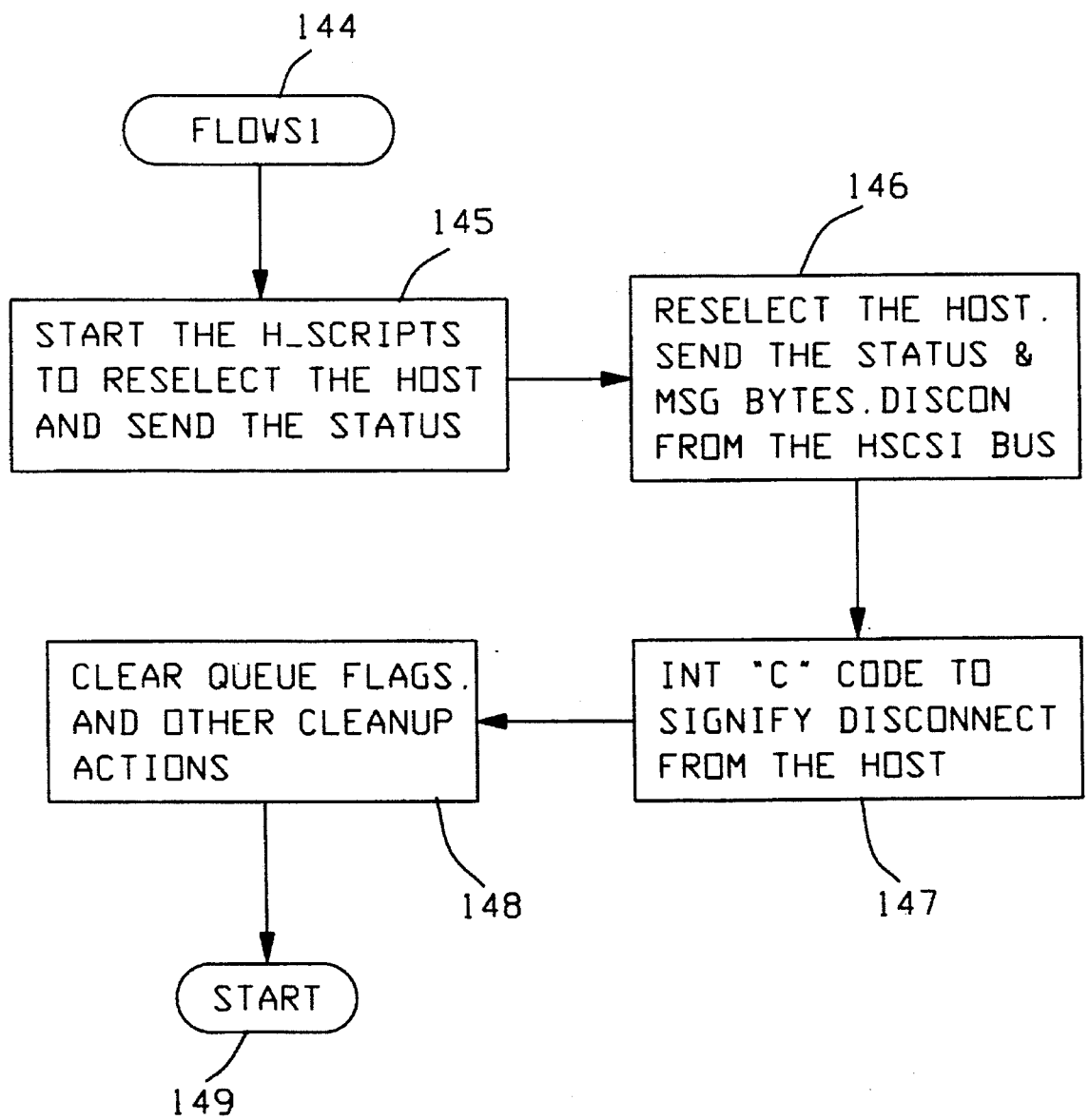

Referring now to FIGS. 10A and 10B, a flow chart of a test operation is shown in detail. From the start bubble 130 entry is made into a decision diamond 131 inquiring if the host has selected the SBC 16a–16f, i.e. the SCSI Bridge Controller shown in detail in FIG. 3. If the answer to this inquiry is no, then a re-entry is made until the answer is yes; whereupon, the queue pointers stored in the SRAM 41 are initialized (block 132). Next, the host SCRIPTS are started so as to determine the action to be taken (block 133). Within the SCRIPTS code in the NCR chip 26, the SCSI phase is determined and command information is received from the host (block 134). Following this, the C code running in the microprocessor 30 is interrupted when the command has been received (block 135).

The C code then determines the command type, sets flags, pointers and FSCSI action flags (block 136). At this juncture of the description it should be pointed out that a convention used in the drawings is to show steps of the C code process on the left-hand side of the drawings and the SCRIPTS code process on the right-hand side of the drawings. Also, when the C code is not busy performing a function it is in the idle mode of operation.

The C code starts the SCRIPTS to disconnect from the host (block 137). This frees the bus 12 for other functions while the SBC continues to set up for the command received. The actual disconnecting from the bus by the SCRIPTS is depicted by block 138, and the C code is interrupted to signify that the disconnection from the host is complete (block 139).

At the same time that the SCRIPTS starts to disconnect from the host, several things happen in the C code as depicted by block 140. The action for the FSCSI bus is determined, flags and pointers are set and selection of the FSCSI drive is started. Following this, the SCRIPTS code within the NCR chip 41 is put into action to select the drive, send the message and command bytes to the drive, receive status and command complete bytes from the drive and wait for the drive to disconnect (block 141). Next, the C code is interrupted when the command is complete (block 142).

The C code now goes into action to get the status byte from the SRAM 41 and set flags, pointers and host message bytes in the SRAM 41 (block 143). At this juncture, reference is made to FIG. 10B for a continuation (via bubble 144) of the test operation. The C code starts the host SCRIPTS code within the NCR chip 26 to reselect the host and send the status of the SBC (block 145). The NCR chip 26 reselects the host, sends the status and message bytes and then disconnects from the HSCSI bus 12 (block 146). The C code is again interrupted to signify the disconnection from the host (block 147). Next, the C code clears the queue flags and performs other clean-up actions (block 148). Bubble 149 signifies the end of the test operation.

Figure 11A:
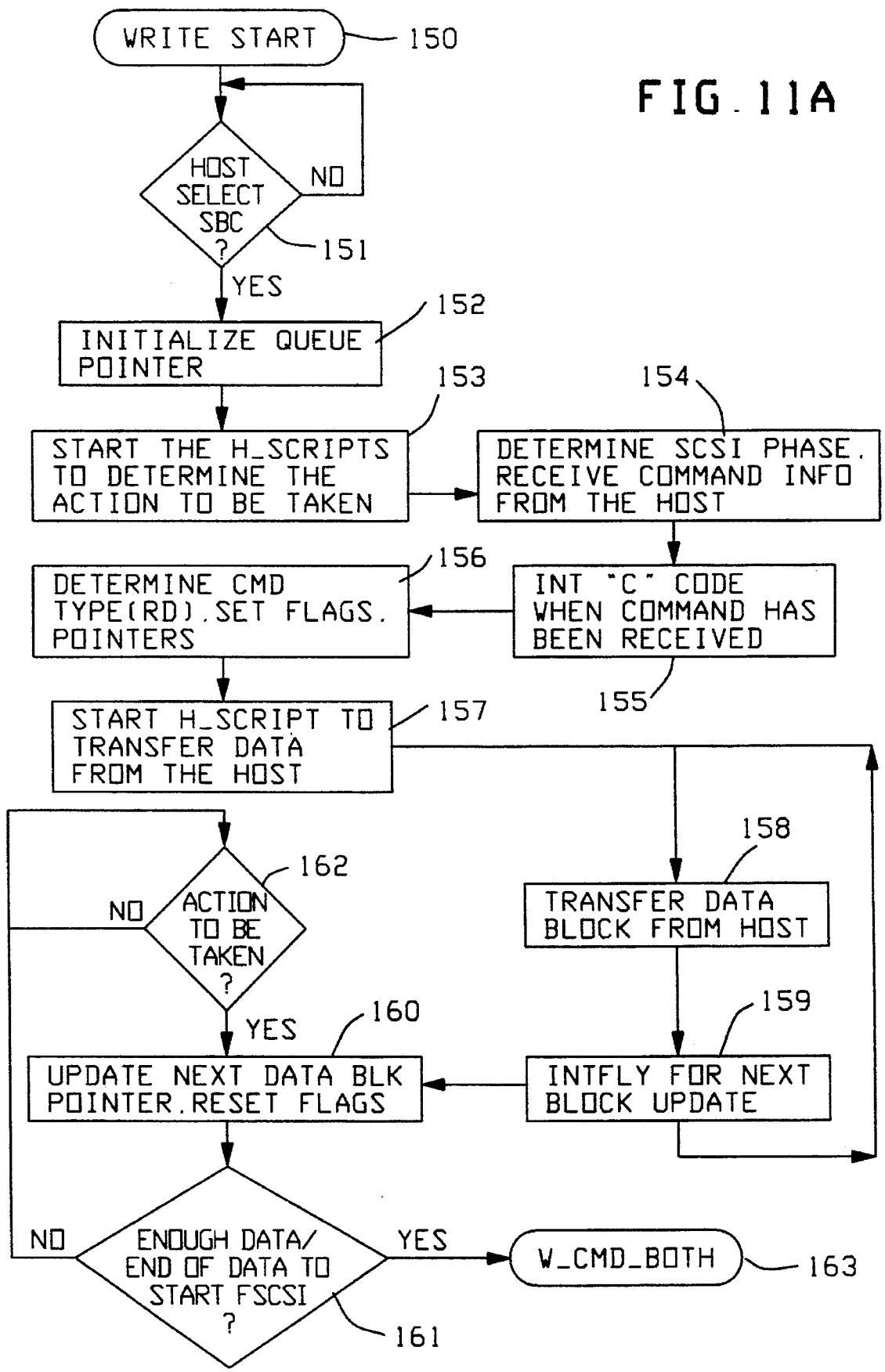
FIGS. 11A thru 11D together form a flow chart of a write to disk operation; and, FIGS. 12A thru 12D together form a flow chart of a read from disk operation.

A write to disk operation is shown in FIGS. 11A, B, C and D. Function blocks 151 through 155 are the same as function blocks 130 through 135 described hereinabove and shown in FIG. 10A. After the C code is interrupted by the HSCSI SCRIPTS code in the NCR chip 26 (block 155), the command type is determined and flags and pointers are set (block 156). in this example, the command type is determined to be a write operation. The host SCRIPTS code in the NCR chip 26 is set to transfer data from the host on the bus 12 (block 157). Data is now transferred from the host to the SRAM 40 (block 158). An interrupt on the fly ("INTFLY") is made for the next block update (block 159); and, within the C code the next data block and pointer are updated and the flags are reset (block 160).

For each block of data received an inquiry is made as to whether or not enough data is received or if the end of data is reached so as to start the drive or FSCSI side, i.e. NCR chip 41 (diamond 161). If the answer is no then an inquiry is made as to whether or not any action is to be taken (diamond 162). Once enough data has been received or the end of the data has been reached, then a branch to is taken to bubble 163 depicting a write command to start FSCSI.

Figure 11B:
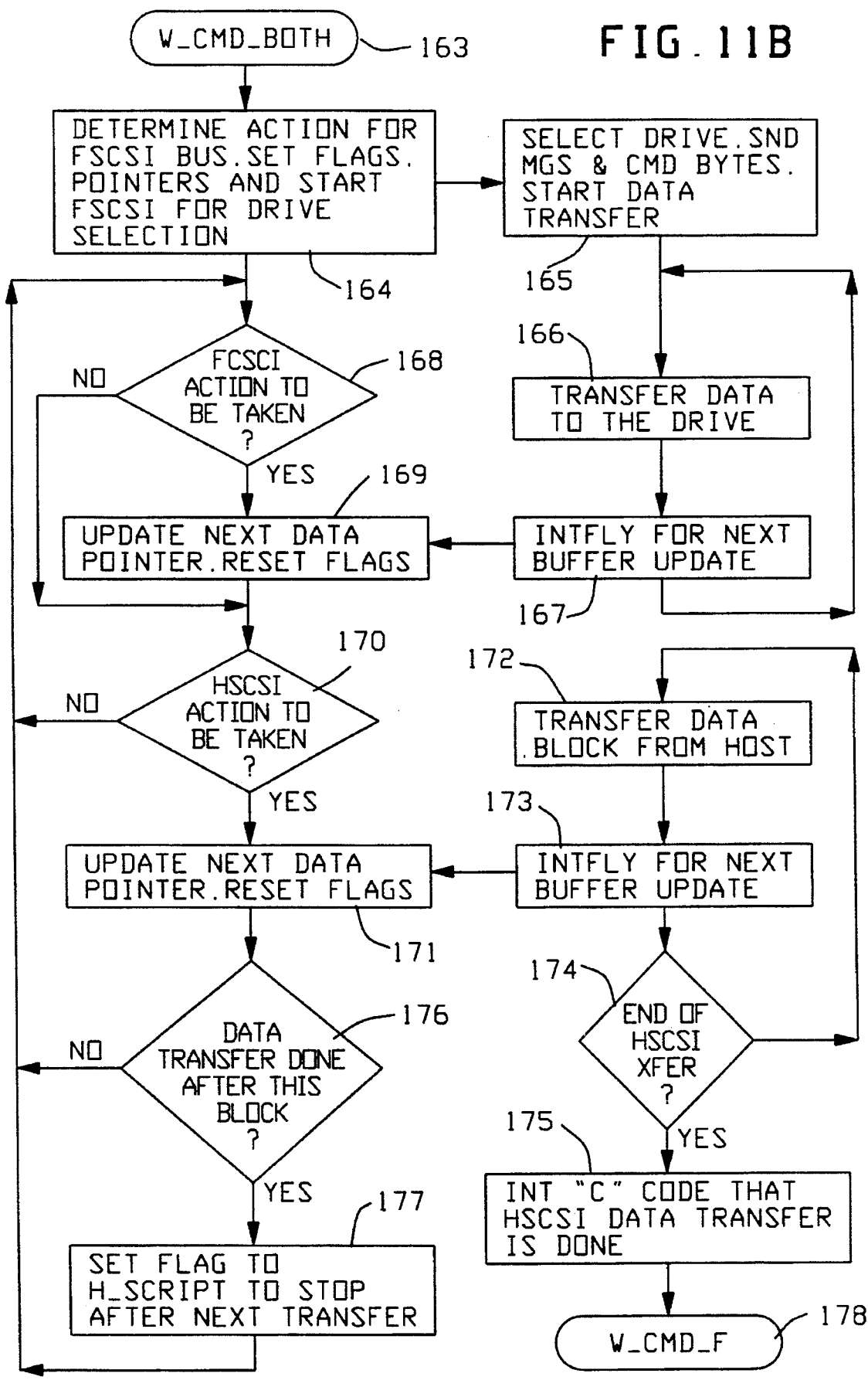

Referring now to FIG. 11B, the action to be taken for the FSCSI bus 19 is determined, flags and pointers are set and the SCRIPTS in the NCR chip 41 is started to select the drive (block 164). Once the drive, the message and the command bytes are selected (block 165); data is transferred to the drive (block 166). As in the description above, an interrupt on the fly (INTFLY) is made for the next buffer update (block 167). This process continues, as represented by the loop back to the block 166, until all data is transferred.

Meanwhile in the C code, a branch from the block 164 is taken to an inquiry diamond 168 to determine if an FSCSI action is to be taken. If yes, the next data pointer is updated and the flags are reset (block 169). Next, an inquiry is made as to whether or not an HSCSI action is to be taken (diamond 170). If no, then a branch is taken back to the diamond 168; but, if yes then the next data pointer is updated and the flags are reset (block 171). Also, if no FSCSI action is to be taken (diamond 168), then a branch is made to the diamond 170 to ask if an HSCSI action is to be taken.

In the NCR chip 26 data is transferred from the host (block 172) and an interrupt on the fly (INTFLY) is made for the next buffer update (block 173). Following this, an inquiry is made as to whether or not this is the end of the HSCSI transfer (diamond 174). If no, then a return branch is taken back to the block 172; but, if yes then the C code is interrupted to inform it that the HSCSI data transfer is complete (block 175). Back in the C code, once the data pointer is updated (block 171), an inquiry is made as to whether or not data transfer is complete after this block of data (diamond 176). If no, then a branch is taken back to diamond 168; but, if yes then the host SCRIPT (NCR chip 26) is set to stop after the next transfer (block 177). Following this a branch is taken back to the decision diamond 168 to start the inquiry loop over again.

Figure 11C:
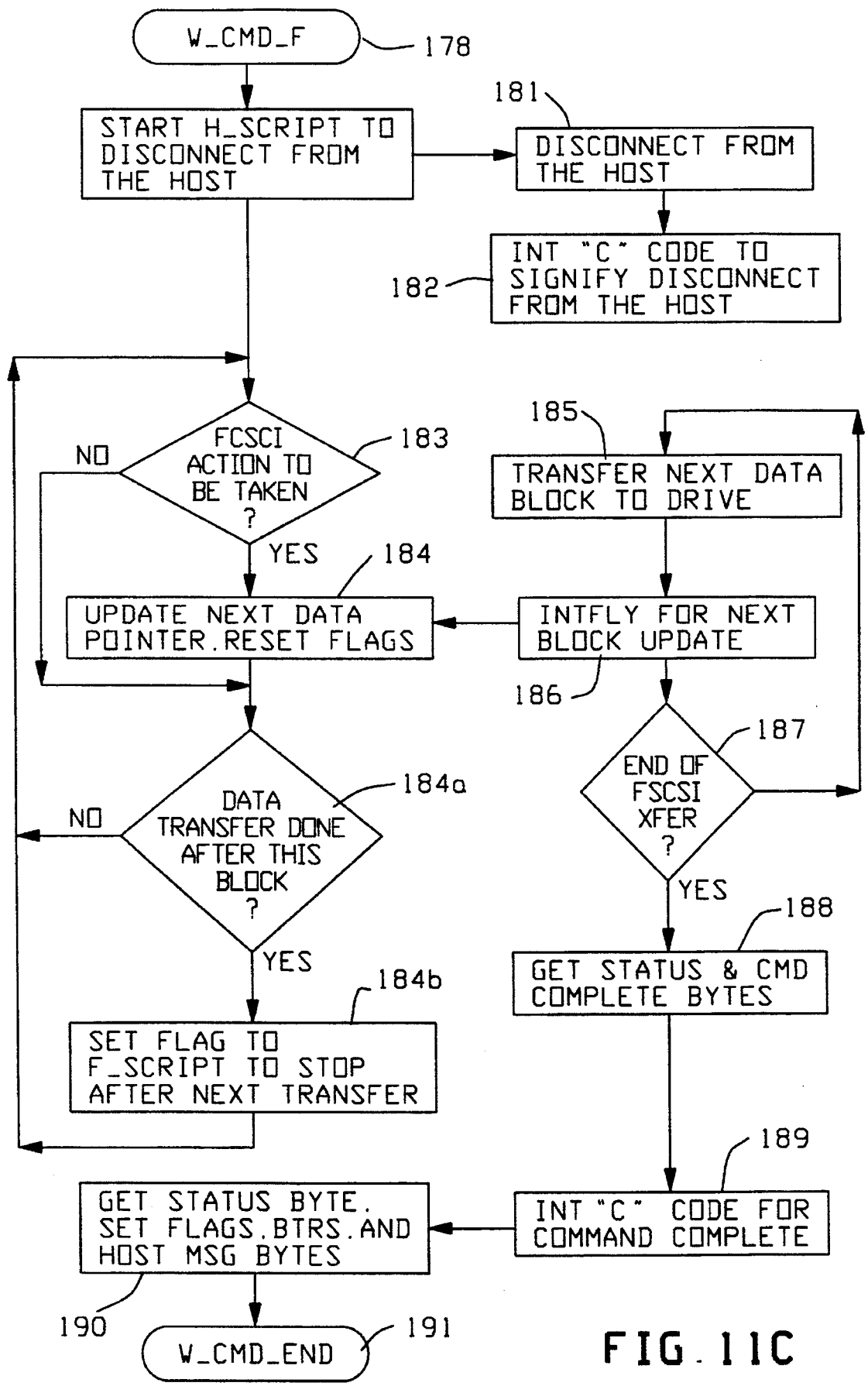

Referring now to FIG. 11C, the C code starts the host SCRIPTS to disconnect from the host (block 180). The NCR chip 26 is disconnected from the host bus 12 (block 181), and the C code is interrupted to signify the disconnection from the host (block 182). Back to the C code, after the function block 180 an inquiry is made as to whether or not an FSCSI action is to be taken (diamond 183). If yes, then the next data pointer is updated and the flags are reset (block 184). Meanwhile in the FSCSI code (i.e. SCRIPTS code in the NCR chip 41) data is being transferred to the drive from the SRAM 40 (blocks 185 and 186). Following the function depicted by the block 186 an inquiry is made as to whether or not the end of the FSCSI transfer has been reached (decision diamond 187). If no, a branch is taken back to the function block 185; and if yes the SCRIPTS gets the status and command complete bytes (block 188). Following this the C code is interrupted by the SCRIPTS code to signify it that the command is complete (block 189). At the same time in the C code, an inquiry is made as to whether the data transfer is done after this block (diamond 184a). If no, then a return is made back to the inquiry diamond 183; and, if yes, then the flag is set to FSCSI SCRIPT to stop after the next transfer (block 184b). The C code is then instructed to get the status bytes, set the flags, pointers and host message bytes (block 190).

Figure 11D:
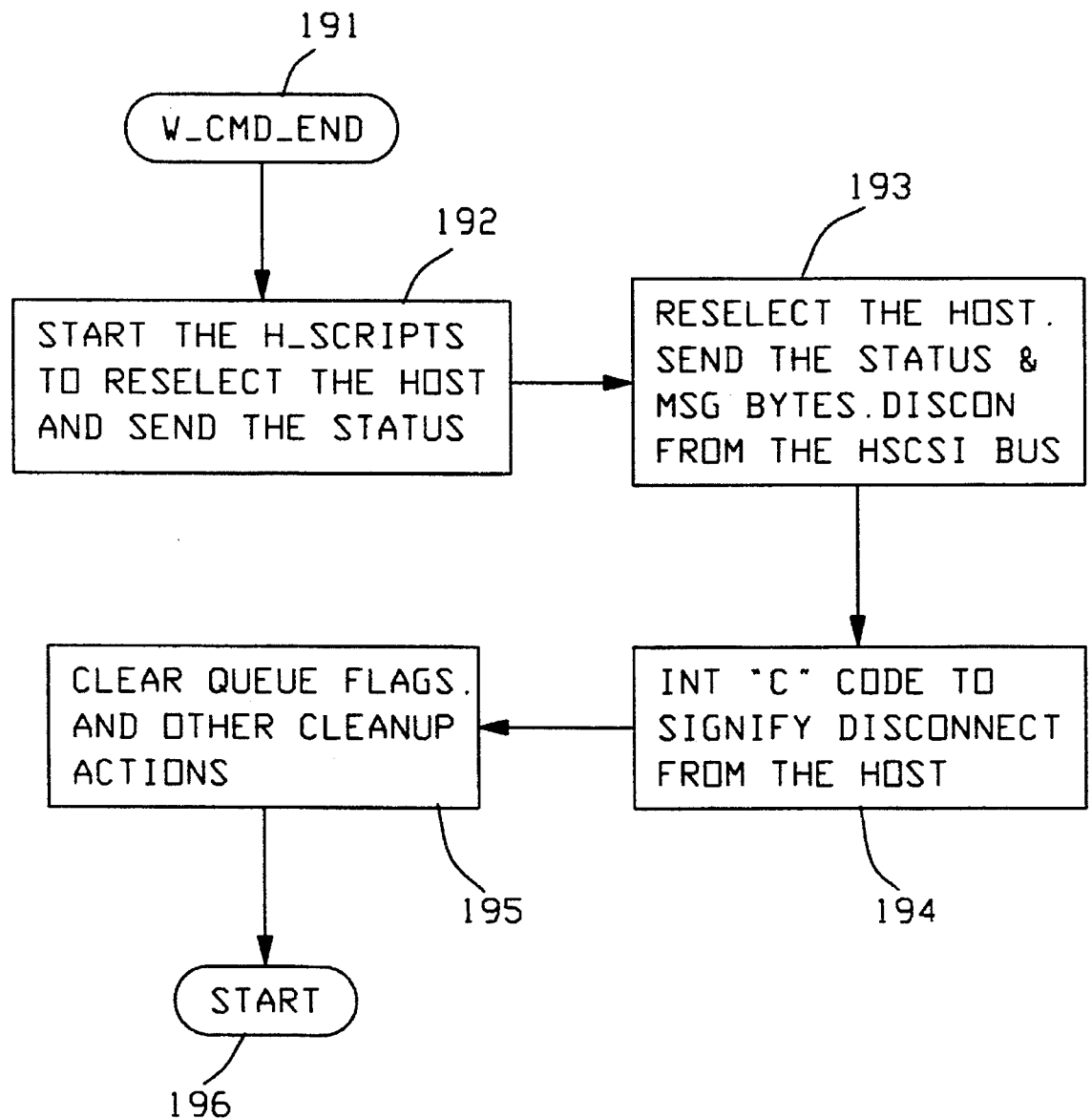

Referring now to FIG. 11D, The C code starts the host SCRIPTS to reselect the host and send the status (block 192). The host SCRIPTS performs these operations and disconnects from the host (block 193). Next, the C code is interrupted to signify the disconnection from the host (block 194). Finally, the C code clears the queue flags and performs other clean-up operations (block 195).

Figure 12A:
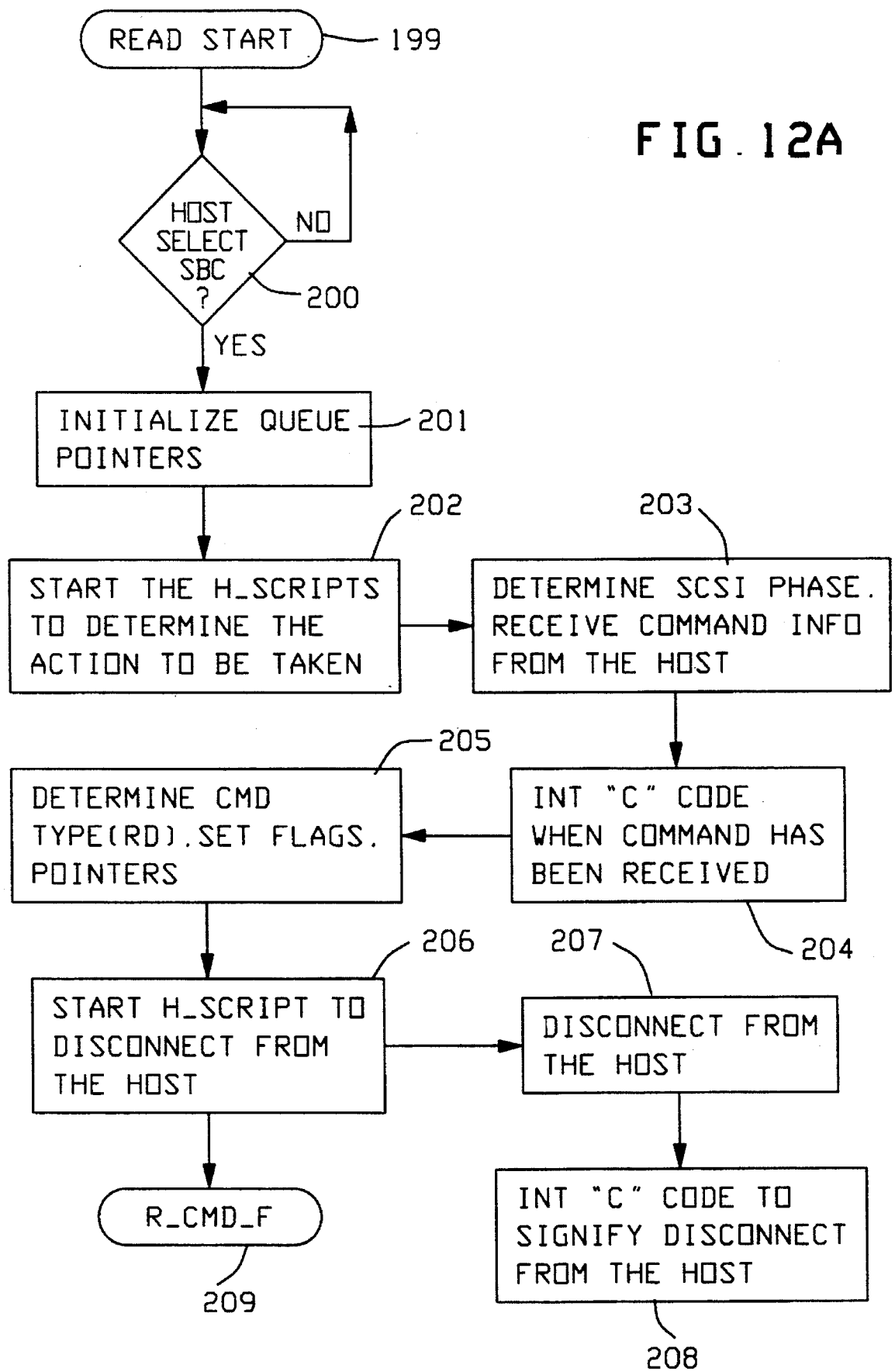

Referring now to FIG. 12A, the beginning portion of a read operation is shown. The functions 200 through 204 are the same as functions 151 through 155 described hereinabove in conjunction with FIG. 11A. The C code determines that the command type is a read operation and sets the flags and pointers (block 205). The host SCRIPTS code in the NCR chip 26 is started to disconnect from the host (block 206), and the SCRIPTS code disconnects from the host (block 207). The C code is interrupted to signify the disconnection from the host (block 208).

Figure 12B:
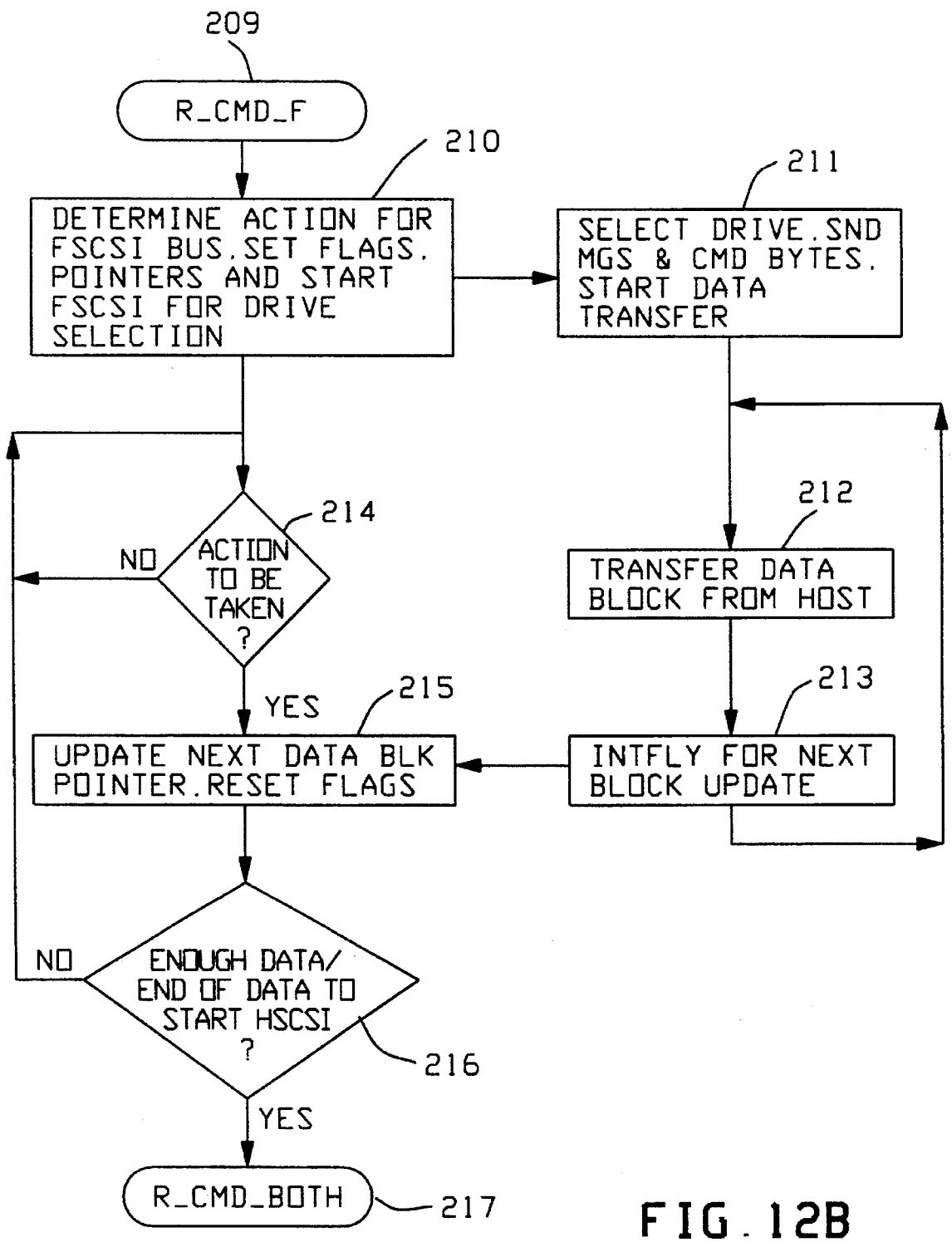

Referring now to FIG. 12B, the action for the FSCSI bus 19 is determined, flags and pointers are set and the SCRIPTS code in the NCR chip 41 is started for drive selection (block 210). The SCRIPTS code selects the drive, sends message and command bytes and starts data transfer (block 211). Data is transferred from the drive a block at a time (block 212) and an interrupt on the fly (INTFLY) is made for the next block update (block 213). Meanwhile, the C code is inquiring if an action is to be taken (decision diamond 214). If yes, the next data block pointer is updated and the flags are reset (block 215). Following this an inquiry is made as to whether or not enough data has been transferred of if the end of the data has been reached so as to start the host SCSI (decision diamond 216). If no, then a return is made to diamond 214; and, if yes, an exit is made to bubble 217, entitled read command both.

Figure 12C:
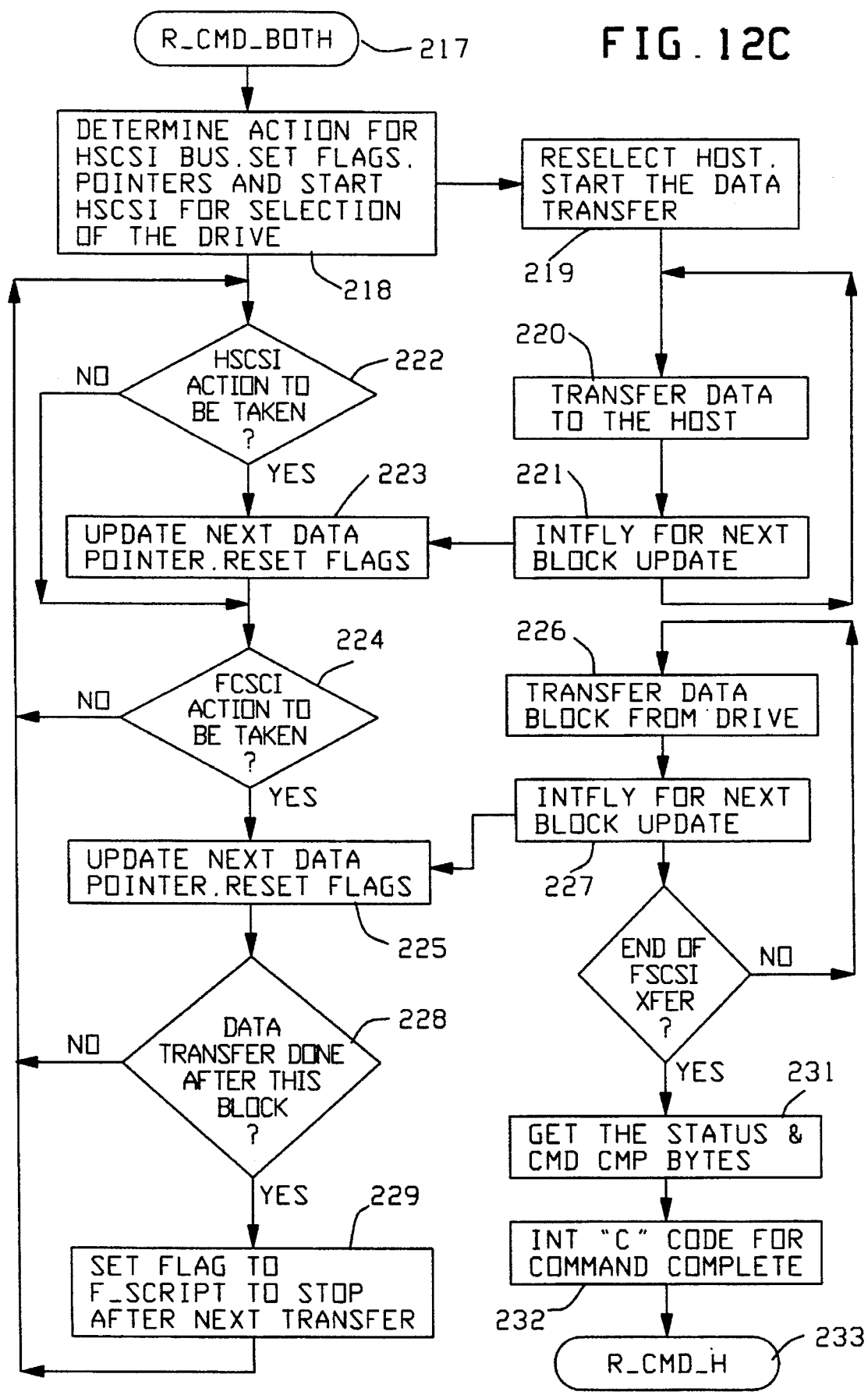

Referring now to FIG. 12C, the C code determines the action for the host SCSI bus 12, sets flags and pointers and starts the host SCRIPTS for drive selection (block 218). The host SCRIPTS code reselects the host and starts the data transfer (block 219). Data is actually transferred to the host (block 220), and an interrupt on the fly is made for the next block update (block 221). A loop back is made from block 221 to block 220 until the transfer is complete. Meanwhile, the C code is making inquiry as to what host SCSI action is to be taken (decision diamond 222). If yes, the next data pointer is updated and the flags are reset (block 223). An inquiry is next made as to any drive SCSI action to be taken (decision diamond 224). If no, a return is made to the beginning of the inquiry loop at diamond 222. On the other hand, if an action is to be taken the next data pointer is updated and the flags are reset (block 225).

While this is going on the SCRIPTS code is controlling data transfer from the drive (block 226). In a similar manner an interrupt on the fly is made for the next block update (block 227). The C code is inquiring as to whether or not the data transfer is complete (decision diamond 228), and if no a return is made to the top of the inquiry loop at diamond 222. If the transfer is complete after this block of data is transferred, the drive side SCRIPTS (NCR 41) flag is set to stop after the next transfer (block 229). At the same time the SCRIPTS code is making a similar inquiry as to whether or not the end of the data transfer has been reached (decision diamond 230). If no, a return is made back to the function block 226 for transfer of data from the drive. If yes, then the SCRIPTS code gets the status and command complete bytes (block 231). Next, the C code is interrupted signifying command complete (block 232).

Figure 12D:
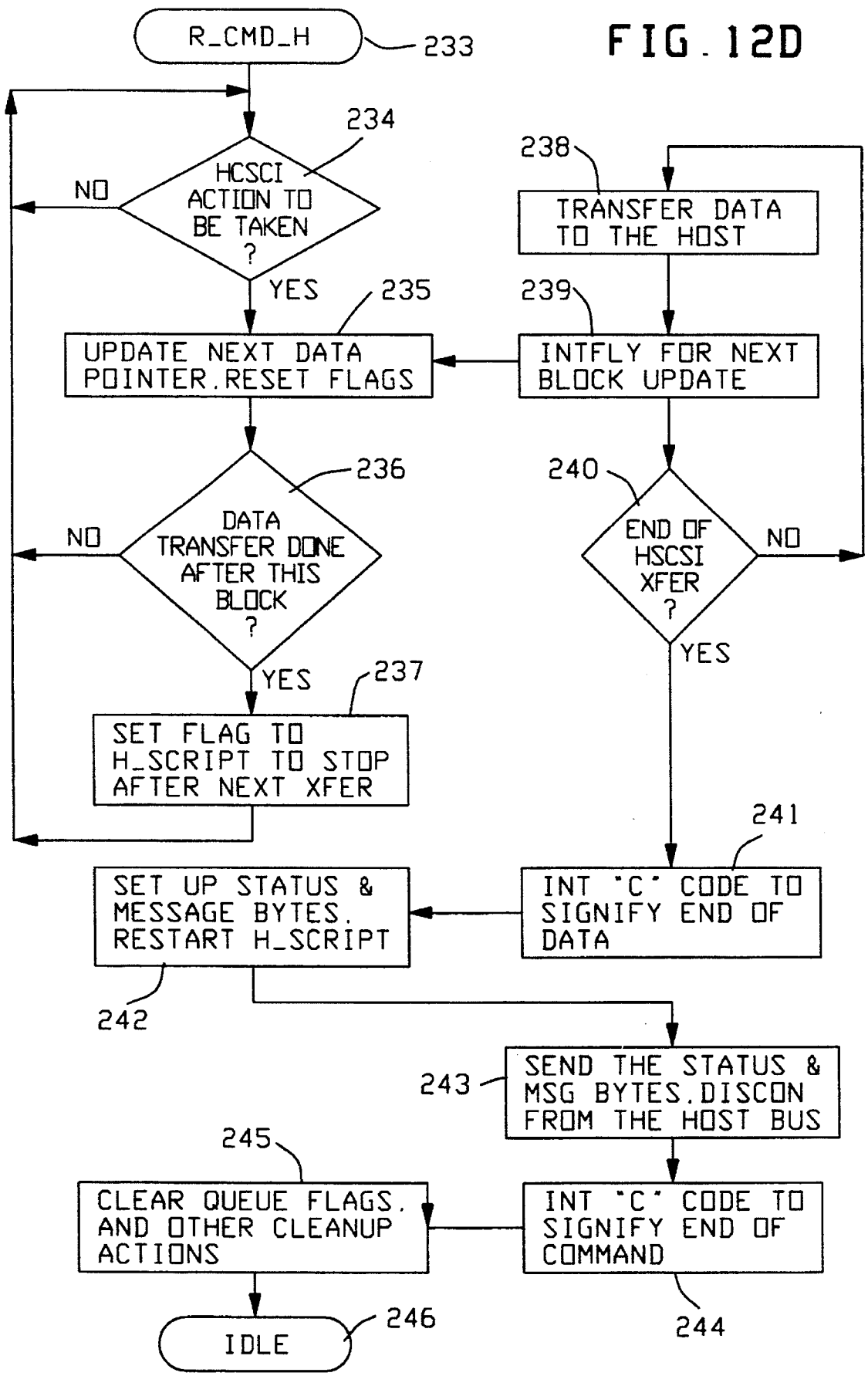

Referring now to FIG. 12D, the C code is inquiring as to whether any host SCSI action is to be taken (decision diamond 234). The next data pointer is updated and the flags are reset (block 235). An inquiry is made as to whether or not the data transfer is complete after this block (decision diamond 236). A flag is set for the host SCRIPTS to stop after the next transfer (block 237). After this function, a return is made to the top of the inquiry loop at diamond 234. Meanwhile, the host SCRIPTS code is transferring data from the SRAM 40 to the host (block 238). An interrupt on the fly is made for the next block update (block 239). An inquiry is made as to whether or not this is the end of the host SCSI transfer (diamond 247). When complete, the C code is interrupted to signify end of the data transfer (block 241). A return is made to the C code to set up status and message bytes and to restart the host SCRIPTS (block 242). The host SCRIPTS code sends the message and status bytes and disconnects from the host bus 12 (block 243). The C code is interrupted to signify end of the command (block 244). The C code then clears the queue flags and performs other cleanup actions (block 245). Following this function the SBC returns to idle (block 246).

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a peripheral storage subsystem having a bridge controller for expanding to a maximum allowable number of disk drives connected to a SCSI channel, said bridge controller including a microprocessor coupled to a DMA bus, a buffer memory having control inputs coupled to said DMA bus, a first bus controller coupled between said SCSI channel and said buffer memory and a second bus controller coupled between said buffer memory and said disk drives, a method operating in said microprocessor and said bus controllers executing a program for controlling data flow in said bridge controller comprising the steps of:

a. receiving a disk drive identifier and a command from said SCSI channel in said first bus controller;

b. initializing queue pointers in said microprocessor in response to said disk drive identifier and said command;

c. determining type of said command and setting flags and pointers in said microprocessor in response thereto;

d. when said command is a write operation, transferring a write block of data from said SCSI channel and storing said write block of data in said buffer memory;

e. disconnecting said bridge controller from said SCSI channel after said write block of data has been stored in said buffer memory;

f. in said second bus controller, selecting a disk drive derived from said disk drive identifier to receive said write block of data by sending message and command bytes derived from said command to said disk drive;

g. in said second bus controller, transferring said write block of data from said buffer memory to said disk drive selected in step f above;

h. disconnecting said bridge controller from said disk drive after status and message bytes are received from said disk drive;

i. reconnecting said bridge controller to said SCSI channel after transfer of said write block of data has been completed;

j. disconnecting from said SCSI channel after sending status and message bytes to said SCSI channel; and, k. clearing queue flags and performing cleanup operations in said bridge controller.

2. A method as in claim 1 wherein said command is a read data operation and steps d through j are replaced with the following steps:

a. in said second bus controller, selecting a disk drive derived from said disk drive identifier and sending message and command bytes derived from said command to said disk drive;

b. transferring a read block of data from said disk drive and storing said read block of data in said buffer memory;

c. disconnecting said bridge controller from said disk drive after status and message bytes are received;

d. reselecting said SCSI channel for receiving said read block of data by sending message bytes to said SCSI channel;

e. transferring said read block of data from said buffer memory to said SCSI channel in said first bus controller; and, f. disconnecting from said SCSI channel after sending said status message bytes to said SCSI channel.

3. In a peripheral storage subsystem having a bridge controller for expanding to a maximum allowable number of disk drives connected to a SCSI channel, said bridge controller including a microprocessor coupled to a DMA bus, a buffer memory having control inputs coupled to said DMA bus, a first bus controller coupled between said SCSI channel and said buffer memory and a second bus controller coupled between said buffer memory and said disk drives, a method operating in said microprocessor and said bus controllers executing a program for controlling data flow in said bridge controller comprising the steps of:

a. receiving a disk drive identifier and a command from said SCSI channel in said first bus controller;

b. initializing queue pointers in said microprocessor in response to said disk drive identifier and said command;

c. determining type of said command and setting flags and pointers in said microprocessor in response thereto;

d. when said command is a write operation, transferring a write block of data from said SCSI channel and storing said write block of data in said buffer memory;

e. disconnecting said bridge controller from said SCSI channel after said write block of data has been stored in said memory;

f. in said second bus controller, selecting a disk drive derived from said disk drive identifier to receive said write block of data by sending message and command bytes derived from said command to said disk drive;

g. in said second bus controller, transferring said write block of data from said memory to said disk drive selected in step e above;

h. disconnecting said bridge controller from said disk drive after status and message bytes are received from said disk drive;

i. reconnecting said bridge controller to said SCSI channel after transfer of said write block of data has been completed;

j. disconnecting from said SCSI channel after sending status and message bytes to said SCSI channel;

k. clearing queue flags and performing cleanup operations in said bridge controller;

l. when said command is a read data operation, in said second bus controller, selecting a disk drive derived from said disk drive identifier and sending message and command bytes derived from said command to said disk drive;

m. transferring a read block of data from said disk drive and storing said read block of data in said buffer memory;

n. disconnecting said bridge controller from said disk drive after status and message bytes are received;

o. re-selecting said SCSI channel for receiving said read block of data by sending message bytes to said SCSI channel;

p. transferring said read block of data from said buffer memory to said SCSI channel in said first bus controller;

q. disconnecting from said SCSI channel after sending said status message bytes to said SCSI channel; and, r. clearing queue flags and performing cleanup operations in said bridge controller.

\* \* \* \* \*